Figure 5:
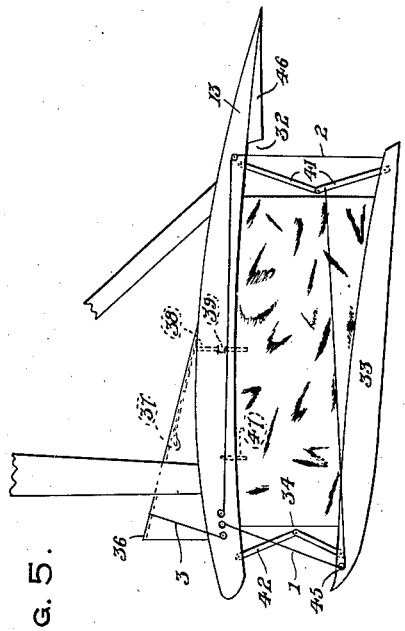

Feb. 17, 1925.  1,526,674
J. V. MARTIN
RETRACTIBLE PONTOON
Original Filed April 24, 1920   2 Sheets-Sheet 1
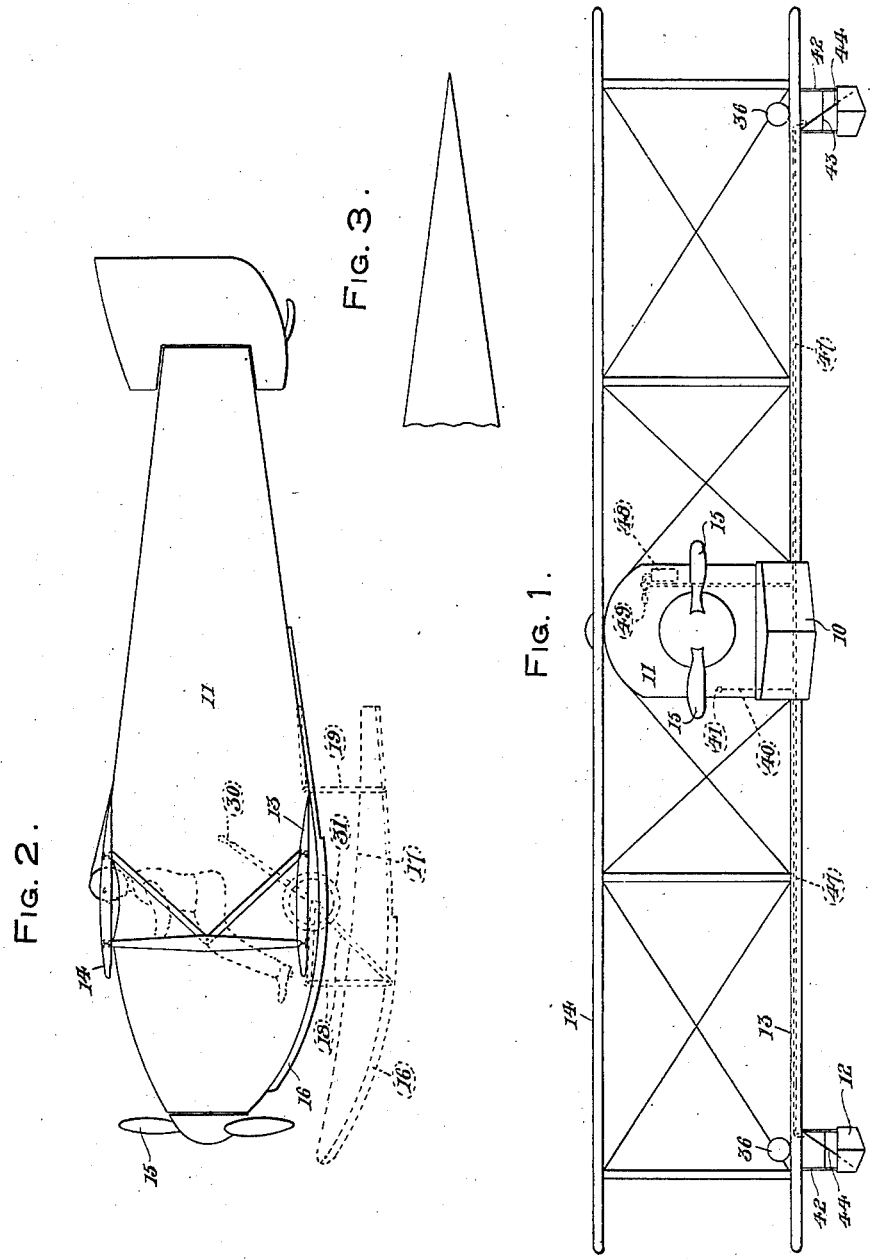

Feb. 17, 1925.

J. V. MARTIN 1,526,674

RETRACTIBLE PONTOON

Original Filed April 24, 1920    2 Sheets-Sheet 2

Inventor
J. V. Martin

By A. M. Wilson
Attorney

Patented Feb. 17, 1925.

1,526,674

UNITED STATES PATENT OFFICE.

JAMES V. MARTIN, OF GARDEN CITY, NEW YORK.

RETRACTIBLE PONTOON.

Application filed April 24, 1920, Serial No. 376,351. Renewed June 30, 1924.

*To all whom it may concern:*

Be it known that I, JAMES V. MARTIN, a citizen of the United States of America, residing at Garden City, in the county of Nassau and State of New York, have invented certain new and useful Improvements in Retractible Pontoons, of which the following is a specification.

This invention relates to the alighting and flotation means employed on land or water type aeroplanes and especially provides parts suitable for either of said types.

The primary object of the invention is to improve the lift drift ratio of seaplanes by providing a strong pontoon of approved planing form adapted during flight to collapse its upper portion and fold close to the main body or wing of the seaplane thus reducing the cross sectional area exposed to the air resistance and streamlining the remaining area.

A further object of the invention is to provide both mechanical and automatic means of inflating and extending or for deflating and retracting the floats of the aeroplane so that should the one means fail the other could be employed.

A still further object of the invention is to provide a single retracting mechanism, the lower portion of which is readily adapted for the attachment of either a pontoon or wheels.

Those conversant with the art will realize that this is not entirely an easy matter since the forms of supports now employed for aeroplanes using wheels differ widely from those using pontoons; but the great advantage of being able to use the identical retracting and supporting frame for either land or water service must be obvious. In this connection it will be observed that I have not shown the particular retracting mechanism employed within the wings or body of the aeroplane, this omission is for the sake of simplicity in this application since I have shown the mechanism in much detail in my retractible chassis Patent 1,306,768 and applications Serial No. 262,477, filed November 14th, 1918, and No. 294,466.

It is also intended to provide means within the surfaces of a wing for the mechanism required to manipulate the collapsing and retracting of wing and pontoons, and to provide streamline forms on the wings to complete the streamlining of the pontoons when the same are in retracted position.

It has not been deemed necessary to show details of aeroplane structure such as ribs and pulley attachments since my invention can readily be applied with ordinary mechanical skill to the most approved aeroplane structure. Obviously the inflating and deflating means shown for the wing end pontoon can be applied to the central pontoon and is omitted to avoid duplication herein.

Figure 8:
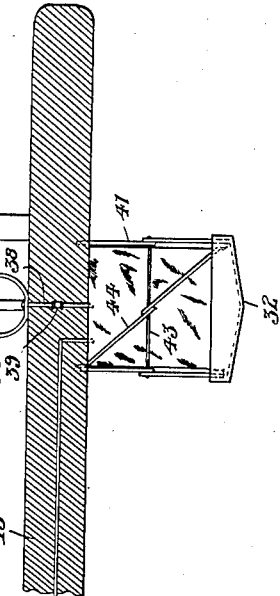
Figure 4:
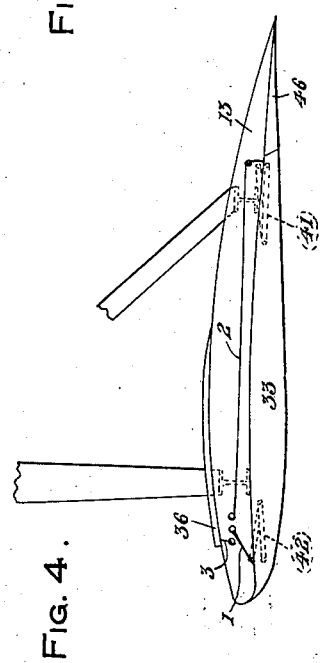
Figure 7:
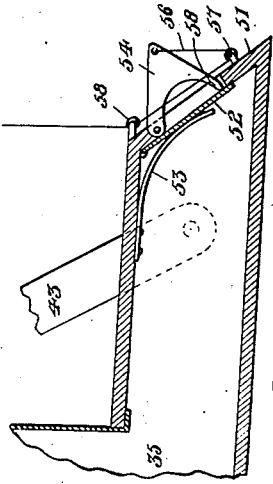
Figure 6:
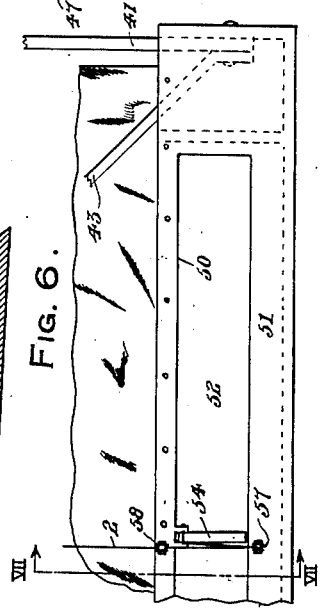

In the drawings forming a part of this application and in which like reference characters designate corresponding parts throughout the several views, Figure 1 is a front elevation of a hydro-aeroplane provided with my invention, Figure 2 is a side elevation thereof with the pontoon illustrated by dotted lines in its open, depressed, operative position, the employment of wheels being also illustrated by dotted lines, Figure 3 is an elevational view of the rear end of a main pontoon of the air craft, Figure 4 is an end view of an aeroplane wing provided with a pontoon in its folded position, Figure 5 is a similar view showing the pontoon open for use, Figure 6 is an enlarged rear elevational view of a portion of the pontoon, Figure 7 is a vertical sectional view taken upon line VII—VII of Fig. 6; and Figure 8 is a longitudinal sectional view through an end portion of the aeroplane wing provided with my invention, the latter being shown in vertical transverse section.

Referring to the accompanying drawings, the flotation means employed to illustrate one form of my invention, shows in Fig. 1, a central pontoon 10 beneath the fuselage 11 and wing end pontoons 12 for the lower wing 13 of the biplane therein illustrated which also has the upper wing or aerofoil 14 and a forward propeller 15. Broadly considered, the pontoon 10 has a rigid bottom 16 with a flexible container 17 upon the top thereof adapted for inflation by air or other gas, and preferably made of elastic material of several plies while foldable braces 18, 19 connect the fuselage 11 with the pontoon bottom 16. Upon deflating the container 17, a lever 20 within the fuselage 11 may be moved for drawing the pontoon bottom 16 upwardly into contact with the bottom of the fuselage and with the container 17 collapsed between said fuselage 11 and bottom 16. The elevating or collapsing mechanism is unnecessary to more specifically describe herein as the same is fully set forth in the patent and applications heretofore referred to. The foldable braces 18 are adapted for mounting ground wheels 31 when it is desired to use the air craft upon land, said wheels 31 being interchanged for the foldable pontoon heretofore described.

The lower wing or aerofoil 13 is adapted for engagement as at 32 with a retractable boat shaped bottom 33 when the wing pontoon is folded. Flexible material 34 connects the bottom 33 with the bottom of the wing 13 forming an inflatable chamber 35 therein, it being understood that the bottom 33 is of hollow formation. A foldable funnel 36 upon the top of the wing 13 above the pontoon 33, 34 is normally held open by means of a spring 37 and during the forward travel of the air craft, the air entering said funnel 36 passes through a pipe 38 into the pontoon receiver 34, a check valve 39 in said pipe preventing the air from escaping therefrom. A cord 3 connected to the funnel 36 passes through the wing 13 to a cable 40 adapted to be pulled by a handle 41 within the fuselage 11, it being understood that by pulling the cable 40, the cord 3 will close the funnel 36 and upon releasing the cable 40, the spring 37 will automatically open the said wind funnel.

Pairs of hinged struts 41 and 42 rearwardly and forwardly of the wing end pontoon pivotally connect the bottom 33 thereof with the bottom of the wing 13 while a transverse rod 43 between the pivoted ends of said struts also pivots a two-part diagonal brace 44 positioned therebetween. In this manner, an inwardly foldable frame is provided at each end of the pontoon bottom 33 and the rod 43 of the rear end frame 41 being provided with a pull cord 1 passes over a pulley 45 adjacent the front end of the bottom 33 and thence into the wing 13 for attachment to the pull cable 40. Upon pulling said cable, the rear frame 41 will be collapsed and the upward pull upon the pulleys 45 will assist the air pressure beneath the bottom 33 to elevate said pontoon bottom into contact with the wing 13. A streamline form 46 rearwardly of the pontoon forms a substantially unbroken surface with the bottom of the wing 13 when the end pontoon is folded.

Experience has shown a certain type or form of pontoon to be best for planing on the surface of the water and that the invention provides means for retaining this the bottom or essential form of the pontoon intact and strong to resist the impact of floating bodies on the water surface while dispensing with the upper or merely buoyant portion, thus a happy combination results saving all the advantages of the present pontoon while largely eliminating the harmful inertia movements and the structural resistance during flight.

A gas line 47 may be provided through the wing 13 from the receiver 34 to a compressed air or gas tank 48 in the fuselage 11 adapted for control by a valve 49 for supplying gas under pressure to the wing end pontoons 33, 34. A slot 50 in the rear end 51 of the pontoon bottom 33 is normally closed by a hinged plate 52 under the action of a spring 53. A rocking lever 54 pivoted to the end member 51 with one corner 55 thereof seated upon the outer face of the plate 52 is adapted for swinging inwardly of the slot 50 by means of a pull cord 56 passing over a pulley 57 beneath the slot 50 and over a similar pulley 58 thereabove, the cord 56 being also attached to the pull cable 40. It will be seen that upon pulling the cable 56, the lever 54 will open the plate 52 permitting the gas or air to escape from the pontoon 33, 34 while the cord 56 also assists in elevating the rear end of the pontoon bottom 33.

When it is desired to use a pontoon for support upon the water, the handle 41 is released and the spring 53 closes the slot 50 in the rear end 51 of the wing end pontoon 33, 34 while the spring 37 automatically opens the wind funnel 36, filling the fabric portion of the receiver 34, which air pressure together with the weight of the bottom 33 extends the pontoon into the position shown in Figs. 1 and 5 of the drawings. The stop or check valve 39 prevents the outflow of air, normally holding the pontoon extended.

To deflate and retract the pontoon 33, 34, the handle 41 is pulled for pulling the cable 40 through the wing 13 and pulling the branch portions thereof or cords 1, 2 and 3. The cord 1 starts the retraction of both the forward and rear portions of the pontoon, while cord 2 first opens the slot 50 in the rear of the pontoon bottom 33 permitting the air to escape therefrom and when the plate 52 has reached the limit of its movement, the cord 2 becomes effective to raise the lower rear end of the pontoon and simultaneously therewith, cord 3 is closing the air funnel 36.

For accomplishing the deflation and retraction of the wing end pontoon automatically, cord 1 may be eliminated and cord 2 opening the slot 50 allows the air within the pontoon to be drawn out by the area of low pressure rearwardly of the pontoon during flight, while the air pressure on the inclined bottom surface of the pontoon bottom 33 forces the latter upwardly contacting the bottom of the wing 13 in its retracted position.

Alternate use of the same aeroplane for water and shipboard service requires an adequate landing angle; this is accomplished by the novel idea of altering the longitudinal plane of the pontoon during retraction.

While the form of the invention herein set forth is believed preferable, it will be understood that changes therein may be made without departing from the spirit and scope of the invention.

What I claim as new is:—

1. In combination with an aircraft, flotation means provided with a collapsible upper portion and said upper portion adapted to be drawn close under the said aircraft when not functioning as a flotation means.

2. In combination with an aircraft, a retractible pontoon therefor, and braces adapted to hold the upper portion of said pontoon in spaced apart relation to the said aircraft while in extended position and to alter the longitudinal angle of the said pontoon relative the said aircraft during retraction of the said pontoon.

3. In combination with an aeroplane adapted to alight on the water, collapsible flotation means including an inflatable upper portion and a hydroplane bottom portion, and means to utilize the air currents due to the aeroplane's flight to inflate the said upper portion.

4. In combination with an aeroplane, an aeroplane wing provided with wing spars, a retractible frame or support adapted at its lower portion for the attachment of wheels or water flotation means selectively, said wheels being positioned between the said wing spars in retracted position.

5. In combination with an aeroplane, a wing, flotation means spaced apart and retractible toward the bottom of said aeroplane, and means housed within the surfaces of said wing for inflating and deflating the said flotation means.

6. In combination with seaplane alighting devices, pontoons having expending and contracting portions, said pontoons adapted for planing on the surface of the water, and means to utilize the air motion due to flight to expand the said pontoons.

7. In combination with an aircraft, an inflatable pontoon comprising a bottom and a flexible receiving member, and retracting means for the bottom whereby the flexible portion of the pontoon is positioned within the latter with the bottom in streamline position beneath the wing of the aircraft.

8. In combination with an aircraft wing, a hollow pontoon bottom, a flexible receiver between the wing and said bottom, and deflating means for the receiver and bottom whereby the air pressure beneath the latter is adapted for automatically closing the same within said recess.

9. In combination with an aeroplane wing, a non-collapsible pontoon bottom connected to the wing and retractible toward said wing, a flexible receiver between said bottom and said wing, and automatic inflating means for said receiver including a release for said automatic inflating means.

10. In combination with an aeroplane wing, a pontoon bottom connected to the wing, a flexible receiver between said bottom and wing, and a forwardly opening wind funnel upon the wing communicating with said receiver.

11. In combination with an aeroplane wing, a pontoon bottom connected to the wing, a flexible receiver between said bottom and wing, a forwardly opening funnel upon the wing, a passage between said funnel and the receiver whereby the latter is adapted for filling with air during the forward movement of the craft, foldable struts connected between the wing and pontoon bottom, and simultaneously operable folding means for said struts and closing means for the funnel.

12. In combination with an aeroplane wing, a pontoon bottom connected to the wing, a flexible receiver between said bottom and wing, a forwardly opening funnel upon the wing, a passage between said funnel and the receiver whereby the latter is adapted for filling with air during the forward movement of the craft, a check valve in said passage, a normally closed air outlet for the bottom, opening means for said outlet, foldable struts connected between the wing and points adjacent the opposite ends of the pontoon bottom, and simultaneous folding means for said struts and closing means for said funnel adapted for actuating said opening means during the retracting of the pontoon.

13. In combination with an aeroplane wing, a pontoon bottom connected to the wing and retractible toward said wing, a flexible receiver between said bottom and wing, inflating means for said receiver, a forwardly opening funnel upon the wing, and a passage between said funnel and the receiver whereby the latter is adapted for filling with air during the forward movement of the craft.

14. In combination with aircraft alighting devices, a pontoon provided on its bottom portion with a hydroplane step, and means for retracting the said pontoon toward the bottom of said aircraft, said means adapted to alter the longitudinal angle of the said pontoon during retraction.

15. An inflatable pontoon spaced apart from and adapted to support an aircraft clear of the water and two means of inflating the said pontoon during the flight of the said aircraft one of said means utilizing the air currents set up by the flight of the aircraft.

16. In combination with a retractible alighting device for aircraft adapted to be drawn under the bottom of said aircraft during flight, two means for retracting said device, one of said means being automatic and means for releasing the said automatic means.

17. In combination with an aeroplane, a retractible pontoon therefor, automatic means of extending the said pontoon and manual means for releasing the said automatic means, and diagonal bracing against lateral stresses between said pontoon and said aeroplane.

18. In combination with an aeroplane fuselage having a streamlined bottom portion, a pontoon spaced apart therefrom and retractible thereto, and adapted to conform to the stream line body when retracted.

19. In combination with the bottom portion of an aeroplane body, a pontoon spaced apart therefrom and retractible thereto, said pontoon provided with an upper portion of greater transverse dimension than the transverse dimension of the said pontoon bottom, and said pontoon upper portion further provided with a concave longitudinal contour adapted to conform in retracted position to the said aeroplane body bottom portion.

In testimony whereof I affix my signature.

JAMES V. MARTIN.